United States Patent
Kunieda

(10) Patent No.: US 10,049,200 B2
(45) Date of Patent: Aug. 14, 2018

(54) ELECTRONIC SEAL, AUTHENTICATION SYSTEM, AND COMPUTER-READABLE RECORDING MEDIUM

(71) Applicant: Takayuki Kunieda, Tokyo (JP)

(72) Inventor: Takayuki Kunieda, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 113 days.

(21) Appl. No.: 15/062,585

(22) Filed: Mar. 7, 2016

(65) Prior Publication Data
US 2016/0275279 A1    Sep. 22, 2016

(30) Foreign Application Priority Data

Mar. 20, 2015  (JP) ................................ 2015-057974

(51) Int. Cl.
*G06F 21/00* (2013.01)
*G06F 21/32* (2013.01)
*G06F 21/35* (2013.01)
*G06F 21/64* (2013.01)
*G06Q 10/00* (2012.01)

(52) U.S. Cl.
CPC ............. *G06F 21/32* (2013.01); *G06F 21/35* (2013.01); *G06F 21/64* (2013.01); *G06Q 10/00* (2013.01)

(58) Field of Classification Search
CPC .......... G06F 21/32; G06F 21/35; G06F 21/64; G06Q 10/00
See application file for complete search history.

(56) References Cited

U.S. PATENT DOCUMENTS

| | | | |
|---|---|---|---|
| 9,310,925 B2* | 4/2016 | Fujii | G06F 3/0416 |
| 2010/0277433 A1* | 11/2010 | Lee | G06F 3/044 345/174 |
| 2012/0300985 A1* | 11/2012 | Ito | G06F 21/32 382/103 |
| 2013/0162555 A1* | 6/2013 | Jensen | G06F 3/042 345/173 |
| 2013/0271403 A1* | 10/2013 | Nagahara | H04L 12/1813 345/173 |
| 2015/0022501 A1* | 1/2015 | Kita | G02F 1/13338 345/174 |
| 2015/0213461 A1* | 7/2015 | Marconi | G06Q 30/0185 250/271 |

FOREIGN PATENT DOCUMENTS

| | | |
|---|---|---|
| CN | 101241569 A | 8/2008 |
| CN | 203812269 U | 9/2014 |
| JP | 2013-222324 | 10/2013 |

OTHER PUBLICATIONS

Chinese Office Action dated Apr. 26, 2018 for CN Patent Application No. 201610140359.8 (English Translation attached).

* cited by examiner

*Primary Examiner* — Morshed Mehedi
(74) *Attorney, Agent, or Firm* — Harness, Dickey & Pierce, P.L.C.

(57) ABSTRACT

An electronic seal includes a detector configured to detect contact of a contact surface; a generator configured to generate a pattern on the contact surface in response to detection of the contact by the detector, the pattern being detectable by an object surface that detects a contact position.

10 Claims, 16 Drawing Sheets

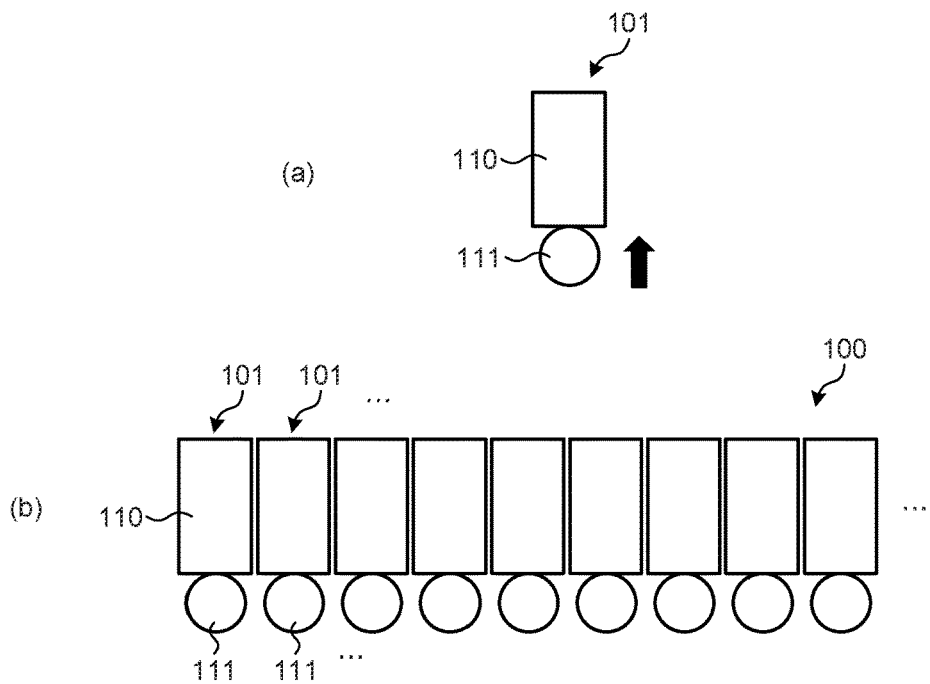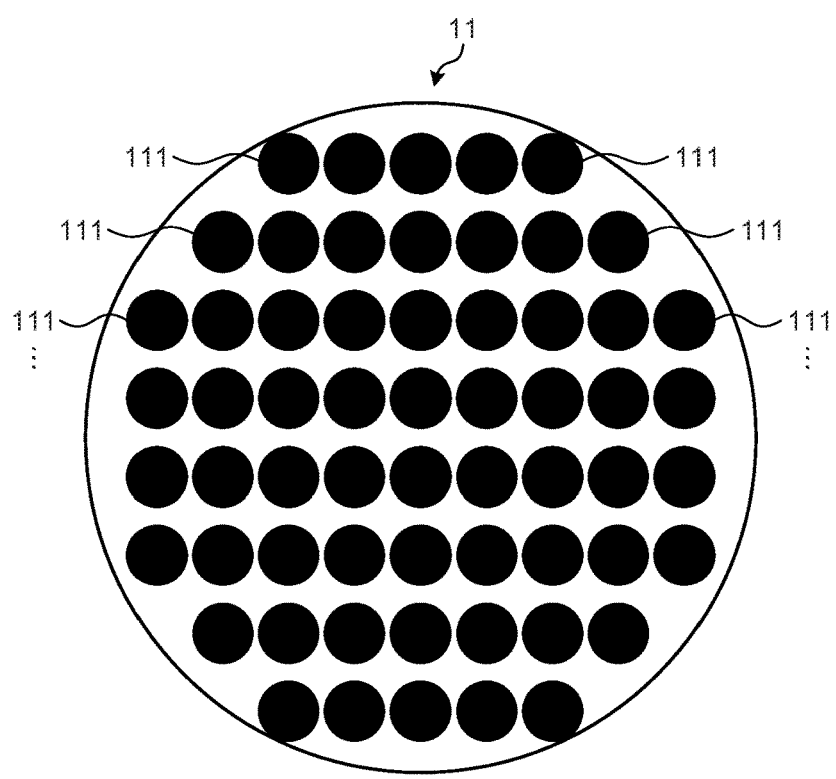

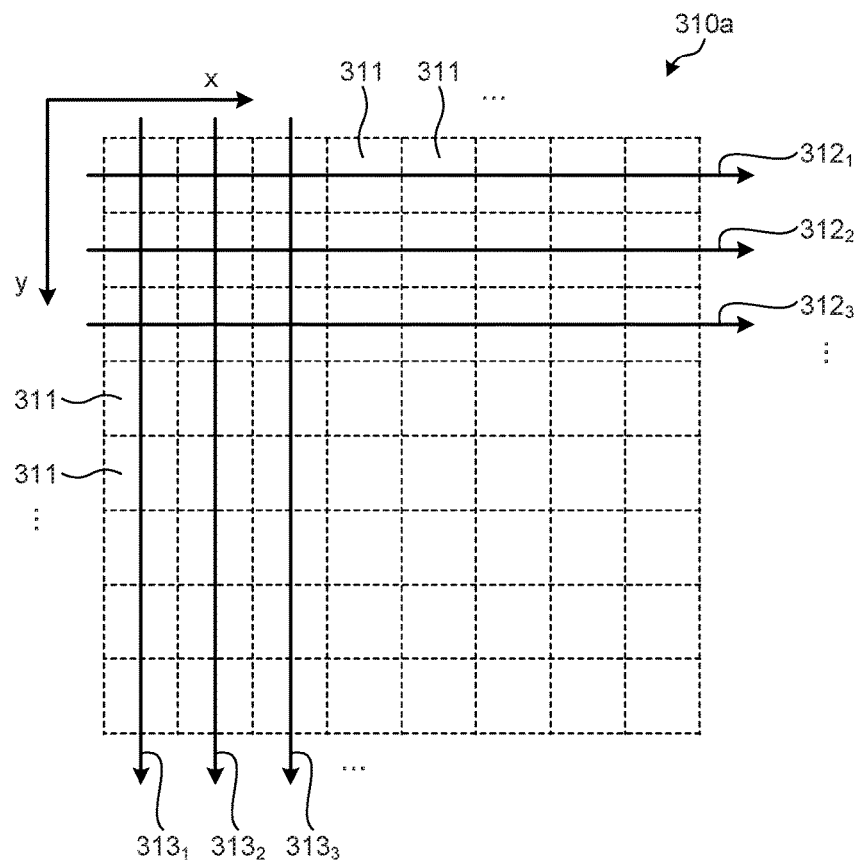
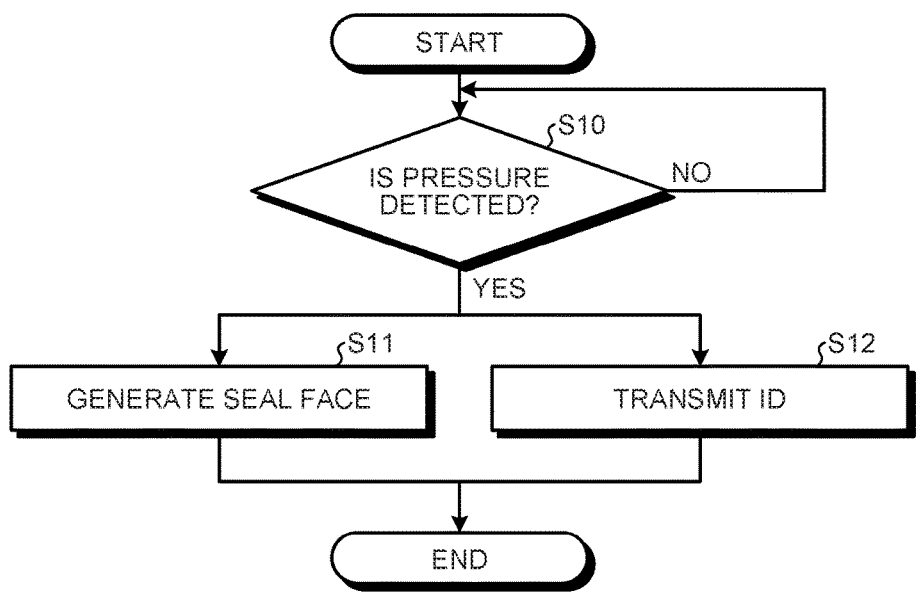

ELECTRONIC SEAL, AUTHENTICATION SYSTEM, AND COMPUTER-READABLE RECORDING MEDIUM

CROSS-REFERENCE TO RELATED APPLICATION

The present application claims priority to and incorporates by reference the entire contents of Japanese Patent Application No. 2015-057974 filed in Japan on Mar. 20, 2015.

BACKGROUND OF THE INVENTION

1. Field of the Invention

The present invention relates to an electronic seal, an authentication system, and a computer-readable recording medium.

2. Description of the Related Art

Conventionally, documents and the like have been generally authenticated by using seals. For example, a specific image is formed on the face of a seal (hereinafter, referred to as a seal face), and the seal face is brought in physical contact with the surface of a document through imprinting of the seal, so that the image of the seal face is formed as a seal impression on the document. The seal impression formed on the document is used as authentication information.

Meanwhile, there has been proposed a technology for using a touch panel and displaying, on the touch panel, an image that a user has drawn on the touch panel. For example, Japanese Laid-open Patent Publication No. 2013-222324 discloses a configuration that displays an image drawn on a touch panel and transmits the image to other information processing apparatuses (personal computers) or the like.

Conventionally, it is difficult to reproduce operation of forming a seal impression on a target object through imprinting of a seal by using an information processing apparatus. For example, even when the technology disclosed in Japanese Laid-open Patent Publication No. 2013-222324 is used, it is generally difficult to repeatedly draw a fixed image by handwriting, and it is difficult to reproduce the operation of imprinting a seal.

Therefore, there is a need to electronically reproduce operation of forming a seal impression on a target object through imprinting of a seal by using an information processing apparatus.

SUMMARY OF THE INVENTION

It is an object of the present invention to at least partially solve the problems in the conventional technology.

According to an embodiment, there is provided an electronic seal that includes a detector configured to detect contact of a contact surface; a generator configured to generate a pattern on the contact surface in response to detection of the contact by the detector, the pattern being detectable by an object surface that detects a contact position.

According to another embodiment, there is provided a non-transitory computer-readable storage medium with an executable program stored thereon and executed by a computer. The program instructs the computer to perform: detecting contact of a contact surface; and generating a pattern on the contact surface in response to detection of the contact at the detecting, the pattern being detectable by an object surface that detects a contact position.

According to still another embodiment, there is provided an authentication system that includes an electronic seal and an information processing apparatus. The electronic seal includes a first detector configured to detect first contact of a first contact surface; a generator configured to generate a pattern on the first contact surface in response to detection of the first contact by the first detector, the pattern being detectable by an object surface that detects a contact position; and a first communication unit configured to transmit identification information through wireless communication in response to detection of the first contact by the first detector. The information processing apparatus includes a second communication unit configured to perform the wireless communication with the first communication unit; a second detector configured to detect second contact of a second contact surface provided in accordance with a display surface of a display unit; an authenticating unit configured to performs an authentication process based on the identification information received by the second communication unit in response to detection of the second contact by the second detector; an image acquiring unit configured to acquire an image in accordance with a position of the second contact on the second contact surface detected by the second detector; and a display controller configured to display the image at a position corresponding to the position of the display surface. When authentication by the authenticating unit is successful, the image acquiring unit acquires the image.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 illustrates elements to form a seal face of the electronic seal according to the first embodiment using an existing technology;

FIG. 3 is a diagram schematically illustrating a configuration of the seal face of the electronic seal according to the first embodiment;

FIG. 11 is a diagram for explaining the imprinting process using the electronic seal according to the first embodiment;

FIG. 12 is an exemplary flowchart illustrating operation of the electronic seal according to the first embodiment;

DETAILED DESCRIPTION OF THE PREFERRED EMBODIMENTS

Exemplary embodiments of an electronic seal, a transmission program, a transmission method, an information processing apparatus, an information processing program, an information processing method, and an authentication system will be described in detail below with reference to the accompanying drawings. "Electrical seal" as used herein is intended to encompass a device for creating not only a seal impression but also qualified (or personal) electrical signatures such as digital signatures or electrical stamps. In particular, the electrical seal according to the embodiments includes an electronic device configured to create, on a display, a seal impression image that is the same as obtained by imprinting with a Japanese traditional "In-kan" or "Hanko".

First Embodiment

Figure 1:
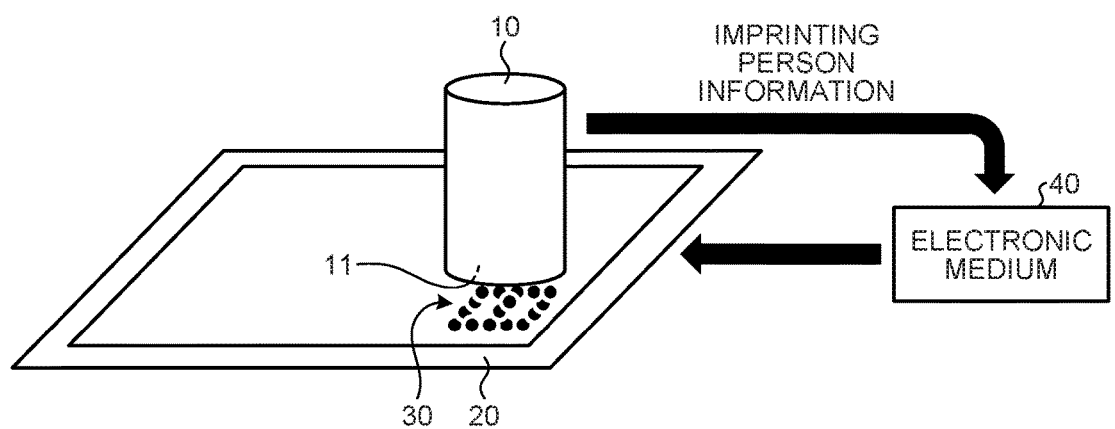
FIG. 1 is a diagram schematically illustrating an imprinting process with an electronic seal according to a first embodiment.

FIG. 1 schematically illustrates an imprinting process with an electronic seal according to a first embodiment. In FIG. 1, for example, a pattern is electrically generated on a seal face 11 of an electronic seal 10. For example, when the electronic seal 10 is brought in contact with a touch panel included in a tablet terminal 20 at a predetermined amount or more of pressure (hereinafter, referred to as imprinting), the tablet terminal 20 acquires the pattern of the seal face 11 through the touch panel. The tablet terminal 20 displays a seal impression image 30 based on the acquired pattern of the seal face 11 on a display device included in the touch panel.

The electronic seal 10 can store information on an imprinting person (hereinafter, referred to as "imprinting person information) in a built-in memory in advance. The electronic seal 10, by being imprinted on the tablet terminal 20, transmits the imprinting person information in the form of an electronic medium 40, such as a file, to the outside by using wireless communication. The tablet terminal 20 receives the electronic medium 40, and performs an authentication process or displays the imprinting person information by using the electronic medium 40.

The touch panel used in the tablet terminal 20 generally employs a capacitance method as a method of detecting a contact position of a contact object. The capacitance method is to detect the contact position based on a change in capacitance between the contact object and a conductive film. In the first embodiment, the seal face of the electronic seal 10 is configured by using a structure that corresponds to the capacitance method and that can control the capacitance at a contact point.

As the structure that can control the capacitance at a contact point, a technology disclosed in Japanese National Publication of International Patent Application No. 2011-516985 is applicable. Japanese National Publication of International Patent Application No. 2011-516985 describes a metallic pen tip and a piezoelectric element that are electrically connected to each other, where the piezoelectric element is arranged in accordance with the pen tip. If a force toward the piezoelectric element acts on the pen tip, the piezoelectric element generates a voltage in accordance with the force, the pen tip is charged by the voltage, and capacitance is generated between the pen tip and a conductive film of the touch panel.

FIG. 2 illustrates elements to form the seal face of the electronic seal 10 according to the first embodiment, in which the seal face is detectable by a touch panel and to which the technology disclosed in Japanese National Publication of International Patent Application No. 2011-516985 is applied. As illustrated in (a) in FIG. 2, a pixel element 101 includes a piezoelectric portion 110 and a conductive contact portion 111 that are electrically connected to each other. The piezoelectric portion 110 generates a voltage in response to a mechanical shock. The piezoelectric portion 110 generates a voltage upon receiving a force in a direction indicated by an arrow in the drawing from the contact portion 111. The contact portion 111 is charged by the voltage, and capacitance is generated between the contact portion 111 and a conductive film of the touch panel.

A plurality of the pixel elements 101 are arrayed and used as a seal face device 100 as an assembly of the pixel elements 101 as illustrated in (b) in FIG. 2.

FIG. 3 schematically illustrates a configuration of the seal face 11 of the electronic seal 10 according to the first embodiment. The seal face 11 is configured by arranging the contact portions 111 of the respective pixel elements 101 included in the seal face device 100 in a matrix form, for example.

In the first embodiment, in the electronic seal 10, each of the pixel elements 101 arranged on the seal face 11 is controlled to form a pattern that is detectable by an object surface (for example, the touch panel of the tablet terminal 20). When the electronic seal 10 is imprinted, the tablet terminal 20 detects the pattern generated on the seal face 11 and forms a seal impression image based on the detected pattern.

Figure 4:
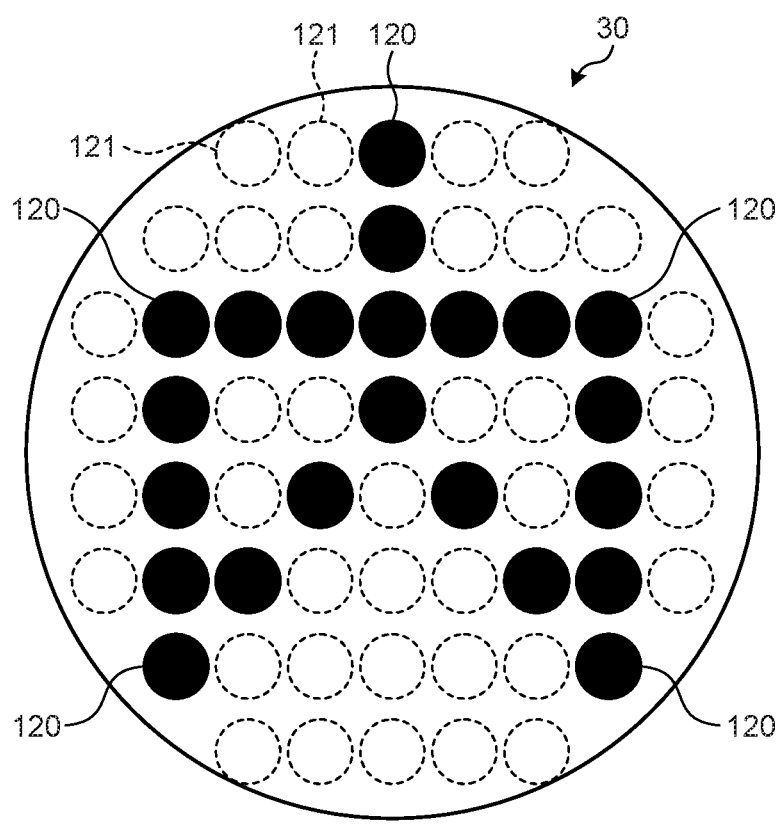
FIG. 4 is a diagram illustrating an example of a seal impression image that is formed based on a pattern of the seal face according to the first embodiment.

FIG. 4 illustrates an example of the seal impression image 30 that is formed based on the pattern of the seal face 11 according to the first embodiment. In FIG. 4, for example, the seal impression image 30 includes dots 120, 120, . . . corresponding to the contact portions 111 at each of which capacitance is detected from the seal face 11 and includes dots 121, 121, . . . corresponding to the contact portions 111 at each of which capacitance is not detected. The seal impression image 30 is formed by a combination of the dots 120 and 121.

Figure 5:
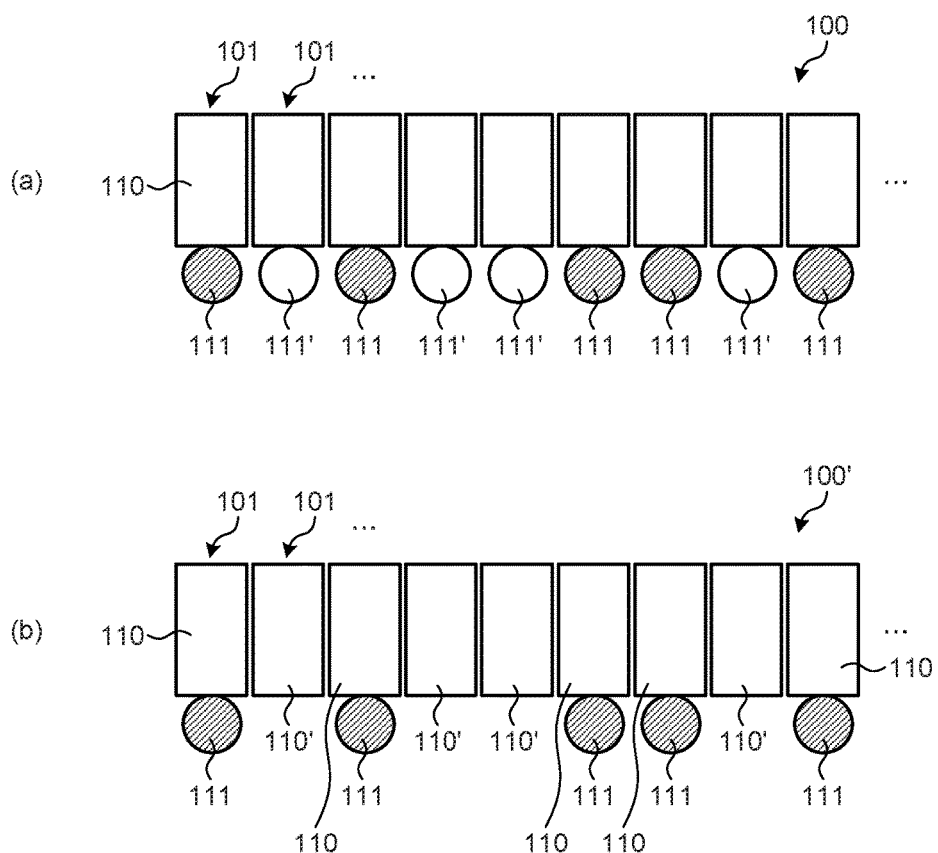
FIG. 5 illustrates examples of a method of generating a pattern by controlling each of pixel elements according to the first embodiment.

FIG. 5 illustrates examples of a method of generating a pattern by controlling each of the pixel elements 101 according to the first embodiment. In FIG. 5, the contact portions 111 enabled for detection of contact positions by the touch panel are indicated by oblique lines. In FIG. 5, (a) illustrates an example in which whether to generate capacitance at the contact portion 111 is controlled for each of the pixel elements 101. In the example in (a) in FIG. 5, the contact portions 111, 111, . . . indicated by oblique lines are controlled such that capacitance is generated by contact, and contact portions 111', 111', . . . indicated by white circles are controlled such that capacitance is not generated by contact.

For example, it is possible to generate a pattern by controlling ON/OFF of a connection between the piezoelectric portion 110 and the contact portion 111 of each of the pixel elements 101 by using a matrix switch corresponding to the array of the pixel elements 101. The positions corresponding to the pixel elements 101 at which connections between the piezoelectric portions 110 and the contact portions 111 are set to ON are the dots 120, 120, . . . as described above, and the positions corresponding to the pixel elements 101 at which the connections are set to OFF are the dots 121, 121, . . . as described above.

The control is not limited to the above-described example. It may be possible to omit the contact portions 111 in accordance with a pattern to be generated. In FIG. 5, (b) illustrates an example of a seal face device 100' in which the contact portions 111 are omitted in accordance with a pattern to be generated. Positions corresponding to piezoelectric portions 110' at which the contact portions 111 are omitted are the dots 121, 121, . . . as described above.

In the configuration illustrated in (a) in FIG. 5 as described above, it is possible to change a configuration of the dots 120 and 121 to be formed, by changing a setting of the matrix switch, for example. For example, in the configuration in (a) in FIG. 5, it is possible to change the seal impression image 30 by control. In contrast, in the configuration in (b) in FIG. 5, the seal impression image 30 is fixed.

Configuration Applicable to the First Embodiment

Figure 6:
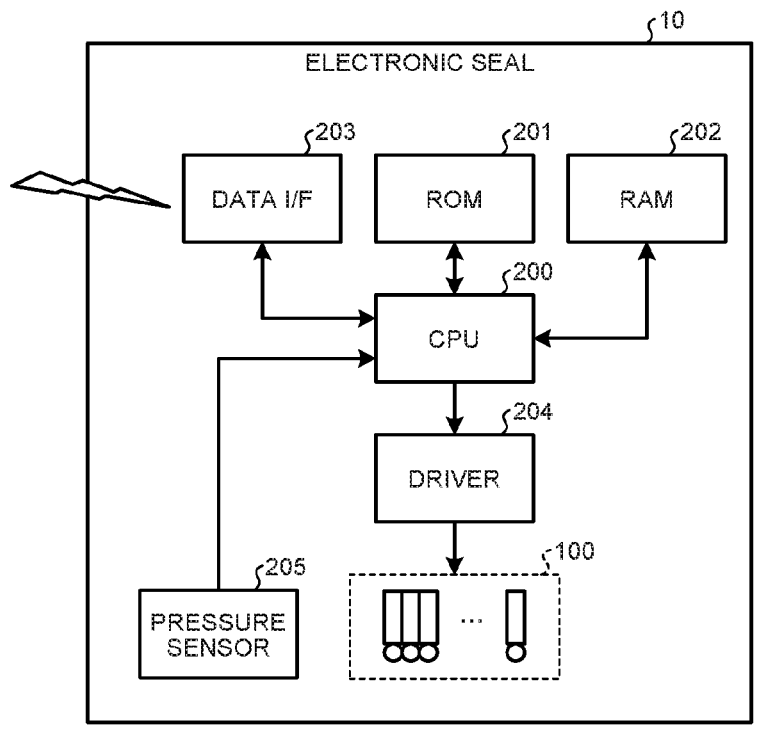
FIG. 6 is a block diagram illustrating an exemplary configuration of the electronic seal according to the first embodiment.

FIG. 6 illustrates an exemplary configuration of the electronic seal 10 according to the first embodiment. The electronic seal 10 includes a central processing unit (CPU) 200, a read only memory (ROM) 201, a random access memory (RAM) 202, a data interface (I/F) 203, a driver 204, a pressure sensor 205, and the seal face device 100.

In the following, the configuration described with reference to (a) in FIG. 5 is employed as the seal face device 100, and pattern generation with the pixel elements 101 is controlled by controlling the matrix switch.

The CPU 200 controls the entire operation of the electronic seal 10 by using the RAM 202 as a work memory in accordance with a program stored in advance in the ROM 201. The ROM 201 is a rewritable non-volatile memory, for example. The data I/F 203 performs wireless communication with external apparatuses under the control of the CPU 200. For example, Bluetooth (registered trademark) low energy or near field communication (NFC) is applicable as the data I/F 203. It may be possible to use infrared communication as the data I/F 203.

The driver 204 controls the seal face device 100 under the control of the CPU 200. For example, the driver 204 controls the matrix switch in accordance with an instruction of the CPU based on image data stored in the ROM 201, and generates a pattern on the seal face device 100.

For example, the driver 204 scans each of the pixel elements 101, 101, . . . of the seal face device 100 at a predetermined speed, and sequentially controls ON/OFF of each of the pixel elements 101 based on the image data for each of the pixel elements 101, so that a pattern is generated. The control is not limited to this example. The driver 204 may generate a pattern by simultaneously controlling ON/OFF of all of the pixel elements 101, 101, . . . of the seal face device 100 based on the image data.

For another example, the driver 204 can switch between sequential control and simultaneous control of ON/OFF of the pixel elements 101, 101, . . . to generate a pattern in accordance with an instruction from the CPU 200. For still another example, when the driver 204 sequentially controls ON/OFF of the pixel elements 101, 101, . . . to generate a pattern, the driver 204 may change a speed of scanning each of the pixel elements 101, 101, . . . in accordance with an instruction from the CPU 200.

For example, it may be possible to provide an operating unit in the electronic seal 10 in order to switch between sequential control and simultaneous control of ON/OFF of the pixel elements 101, 101, . . . and in order to change the speed of scanning each of the pixel elements 101, 101, . . . . The CPU 200 gives an instruction on a pattern generation method to the driver 204 in accordance with user operation on the operating unit.

The pressure sensor 205 detects a pressure on the seal face 11. A detection result of the pressure sensor is provided to the CPU 200.

As described above, the electronic seal 10 includes the CPU 200, the ROM 201, and the RAM 202, and the CPU 200 is caused to control operation by the program stored in the ROM 201. Therefore, the electronic seal 10 can be considered as a kind of an information processing apparatus.

Figure 7:
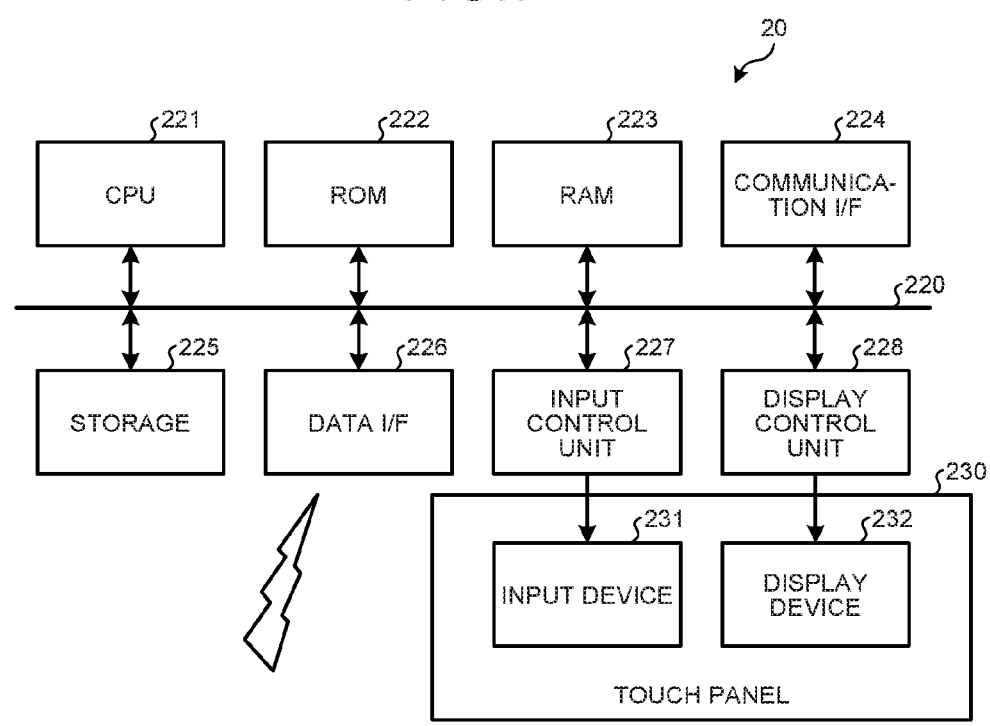
FIG. 7 is a block diagram illustrating an exemplary configuration of a tablet terminal applicable to the first embodiment.

FIG. 7 illustrates an exemplary configuration of the tablet terminal 20 applicable to the first embodiment. The tablet terminal 20 includes a CPU 221, a ROM 222, a RAM 223, a communication I/F 224, a storage 225, a data I/F 226, an input control unit 227, a display control unit 228, and a touch panel 230. The CPU 221, the ROM 222, the RAM 223, the communication I/F 224, the storage 225, the data I/F 226, the input control unit 227, and the display control unit 228 are communicably connected to one another via a bus 220.

The CPU 221 controls the entire operation of the tablet terminal 20 by using the RAM 223 as a work memory in accordance with a program stored in the ROM 222 or the storage 225. The storage 225 is, for example, a non-volatile semiconductor memory, such as a flash memory, and stores therein a program that causes the CPU 221 to operate, data referred to by the program, and the like.

The communication I/F 224 performs communication with external apparatuses via a communication network, such as the Internet or a local area network (LAN), under the control of the CPU 221. The data I/F 226 corresponds to the above-described data I/F 203, and corresponds to Bluetooth (registered trademark) low energy, NFC, or infrared communication.

The touch panel 230 includes an input device 231 that detects a contact position based on capacitance, and includes a display device 232 that displays an image in accordance with a display signal, where the input device 231 and the display device 232 are integrated. In the first embodiment, the surface of the touch panel 230 serves as an object surface to be contacted by the seal face 11 that is a contact surface of the electronic seal 10. The input control unit 227 drives the input device 231 to scan a voltage of a conductive film provided on the input device 231, to detect a change in capacitance of the conductive film, and to send to CPU 221 with position information indicating a position at which the change is detected. The display control unit 228 drives the display device 232 in accordance with a display control signal generated by the CPU 221 to display an image corresponding to the display control signal.

Figure 8:
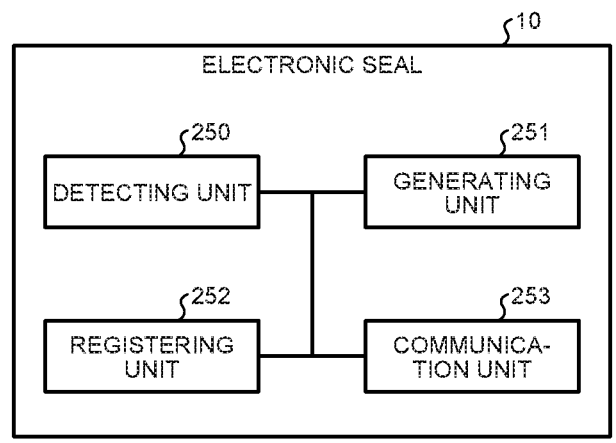
FIG. 8 is an exemplary functional block diagram illustrating functions of the electronic seal according to the first embodiment.

FIG. 8 is an exemplary functional block diagram illustrating functions of the electronic seal 10 according to the first embodiment. In FIG. 8, the electronic seal 10 includes a detecting unit 250, a generating unit 251, a registering unit 252, and a communication unit 253. The detecting unit 250, the generating unit 251, the registering unit 252, and the communication unit 253 are implemented by a program that runs on the CPU 200. The configuration is not limited to this example. All or part of the detecting unit 250, the generating unit 251, the registering unit 252, and the communication unit 253 may be configured by independent hardware.

The detecting unit 250 detects contact of the seal face 11 with a different object based on an output of the pressure sensor 205. The generating unit 251 generates a pattern on the seal face 11 based on image data. The registering unit 252 stores image data, which is provided from the outside via the data I/F 203, and imprinting person information in the ROM 201 in an associated manner, and registers the image data and the imprinting person information. The communication unit 253 controls communication using the data I/F 203 in accordance with a detection result of the detecting unit 250.

The detecting unit 250, the generating unit 251, the registering unit 252, and the communication unit 253 are implemented by, for example, a transmission program that is stored in the ROM 201 and that runs on the CPU 200. The transmission program is provided by being incorporated in the ROM 201 in advance.

The transmission program is not limited to this example. The transmission program according to the first embodiment may be provided by being recorded in a computer-readable recording medium, such as a compact disk (CD), a flexible disk (FD), or a digital versatile disk (DVD), in the form of a computer-installable or a computer-executable file.

Furthermore, the transmission program executed by the electronic seal 10 of the first embodiment may be stored in a computer connected to a network, such as the Internet, and may be provided by being downloaded via the network. Moreover, the program executed by the electronic seal 10 of the first embodiment may be provided or distributed via a network, such as the Internet.

The transmission program executed by the tablet terminal 20 of the first embodiment has a module structure including the above-described units (the detecting unit 250, the generating unit 251, the registering unit 252, and the communication unit 253). As actual hardware, the CPU 200 reads the transmission program from the ROM 201 and executes the transmission program, so that the above-described units are loaded on a main storage device, such as the RAM 202, and the detecting unit 250, the generating unit 251, the registering unit 252, and the communication unit 253 are generated on the main storage device.

Figure 9:
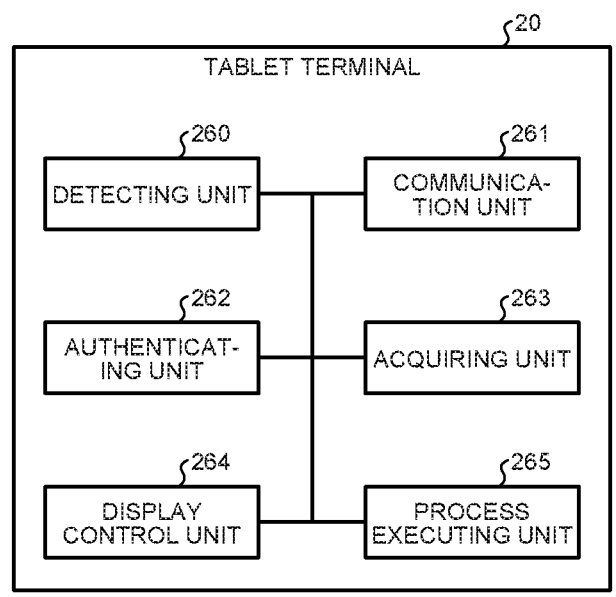
FIG. 9 is an exemplary functional block diagram illustrating functions of the tablet terminal according to the first embodiment.

FIG. 9 is an exemplary functional block diagram illustrating functions of the tablet terminal 20 according to the first embodiment. In FIG. 9, the tablet terminal 20 includes a detecting unit 260, a communication unit 261, an authenticating unit 262, an acquiring unit 263, a display control unit 264, and a process executing unit 265. The detecting unit 260, the communication unit 261, the authenticating unit 262, the acquiring unit 263, the display control unit 264, and the process executing unit 265 are implemented by a program that runs on the CPU 221. The configuration is not limited to this example. All or part of the detecting unit 260, the communication unit 261, the authenticating unit 262, the acquiring unit 263, the display control unit 264, and the process executing unit 265 may be configured by independent hardware.

The detecting unit 260 detects contact of the input device 231 based on a signal from the input control unit 227. The detecting unit 260 detects a contact position on the input device 231, and acquires position information. The communication unit 261 controls communication using the data I/F 226. The authenticating unit 262 performs an authentication process on the imprinting person information. The acquiring unit 263 acquires the seal impression image 30 based on the position information acquired by the detecting unit 260. The display control unit 264 controls display on the display device 232. The process executing unit 265 performs a process corresponding to imprinting of the electronic seal 10 on the tablet terminal 20.

The detecting unit 260, the communication unit 261, the authenticating unit 262, the acquiring unit 263, the display control unit 264, and the process executing unit 265 are implemented by, for example, an information processing program that is stored in the storage 225 and that runs on the CPU 221. The information processing program is provided by being recorded in a computer-readable recording medium, such as a CD, an FD, or a DVD, in the form of a computer-installable or a computer-executable file.

The information processing program executed by the tablet terminal 20 of the first embodiment may be stored in a computer connected to a network, such as the Internet, and may be provided by being downloaded via the network. Furthermore, the program executed by the tablet terminal 20 of the first embodiment may be provided or distributed via a network, such as the Internet. Moreover, the information processing program of the first embodiment may be provided by being incorporated in the ROM 222 or the like in advance.

The information processing program executed by the tablet terminal 20 of the first embodiment has a module structure including the above-described units (the detecting unit 260, the communication unit 261, the authenticating unit 262, the acquiring unit 263, the display control unit 264, and the process executing unit 265). As actual hardware, the CPU 221 reads the information processing program from a storage medium, such as the storage 225 or the ROM 222, and executes the information processing program, so that the above-described units are loaded on a main storage device, such as the RAM 223, and the detecting unit 260, the communication unit 261, the authenticating unit 262, the acquiring unit 263, the display control unit 264, and the process executing unit 265 are generated on the main storage device.

Imprinting Process According to the First Embodiment

Figure 10:
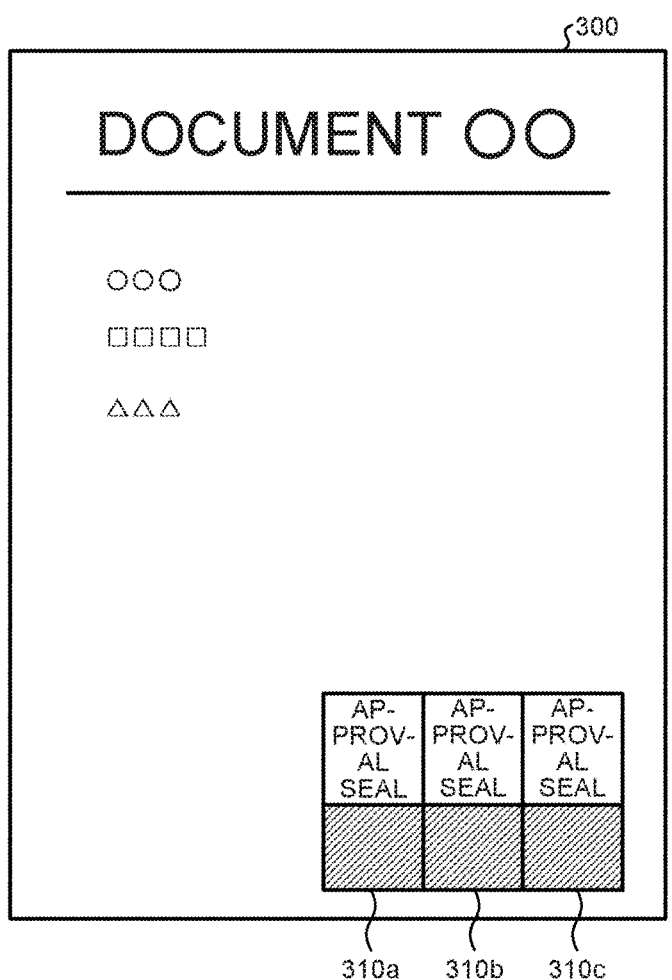
FIG. 10 is a diagram for explaining the imprinting process using the electronic seal according to the first embodiment.

An imprinting process using the electronic seal 10 according to the first embodiment will be described below. For example, a document image 300 as illustrated in FIG. 10 will be described. In the document image 300, imprint areas 310a, 310b, and 310c for imprinting the electronic seal 10 are provided. The document image 300 is read by the tablet terminal 20 through the communication I/F 224 or the data I/F 226, and displayed on the display device 232. Position information indicating positions of the imprint areas 310a, 310b, and 310c is added to the document image 300, and the tablet terminal 20 can acquire the position information by reading the document image 300.

In the tablet terminal 20, the acquiring unit 263 can scan the insides of the provided imprint areas, for example. For example, it is assumed that the input device 231 has detected contact by scanned cells whose position are acquired arranged in a matrix pattern. In this case, as illustrated in FIG. 11, the acquiring unit 263 controls the input control unit 227 in order to firstly scanned cells 311, 311, . . . of the imprint area 310a in the horizontal direction as indicated by arrows $312_1$, $312_2$, $312_3$, . . . and subsequently perform scanning in the vertical direction as indicated by arrows $313_1$, $313_2$, $313_3$, . . . , for example. Through the scanning in the horizontal direction and the vertical direction, it is possible to detect which of the scanned cells 311, 311, . . . is contacted.

While the explanation has been made on an example in which the acquiring unit 263 acquires a contact position by performing scanning in a limited area on the input device 231, the operation is not limited to this example. Specifically, the acquiring unit 263 may acquire a contact position by scanning the whole area of the input device 231.

If ON/OFF is sequentially controlled by scanning each of the pixel elements 101, 101, . . . on the electronic seal 10, it is preferable that the speed of scan performed by the acquiring unit 263 and the speed of scan performed on the electronic seal 10 be different. For example, as described above, it may be possible to allow a user to change a method of generating a pattern on the electronic seal 10, and select an appropriate method of generating a pattern in accordance with an acquisition result of a contact position obtained by the acquiring unit 263.

FIG. 12 is an exemplary flowchart illustrating operation of the electronic seal 10 according to the first embodiment. Before the process of the flowchart in FIG. 12, it is assumed that image data for generating a pattern on the seal face 11 and imprinting person information as information indicating an imprinting person who performs imprinting are stored in advance in the ROM 201 in an associated manner.

At Step S10, the electronic seal 10 determines whether a pressure on the seal face 11 is detected, on the basis of a detection result of the detecting unit 250 corresponding to an output of the pressure sensor 205. If it is determined that the pressure is not detected, the process returns to Step S10. In contrast, if it is determined that the pressure is detected, the process proceeds to Step S11 and Step S12. The processes at Step S11 and Step S12 may be performed in parallel as illustrated in FIG. 12. Alternatively, the processes at Step S11 and Step S12 may be sequentially performed.

At Step S11, the electronic seal 10 generates a pattern of the seal face 11 by using the generating unit 251. For example, the generating unit 251 generates a pattern by controlling ON/OFF of a connection between the piezoelectric portion 110 and the contact portion 111 of each of the pixel elements 101, 101, . . . by controlling the driver 204 based on the image data stored in the ROM 201. At Step S12, the communication unit 253 of the electronic seal 10 reads the imprinting person information that is stored in association with the image data in the registering unit 252, and transmits the read information as ID information from the data I/F 203.

When the processes at Step S11 and Step S12 end, a series of the processes of the flowchart in FIG. 12 ends.

Figure 13:
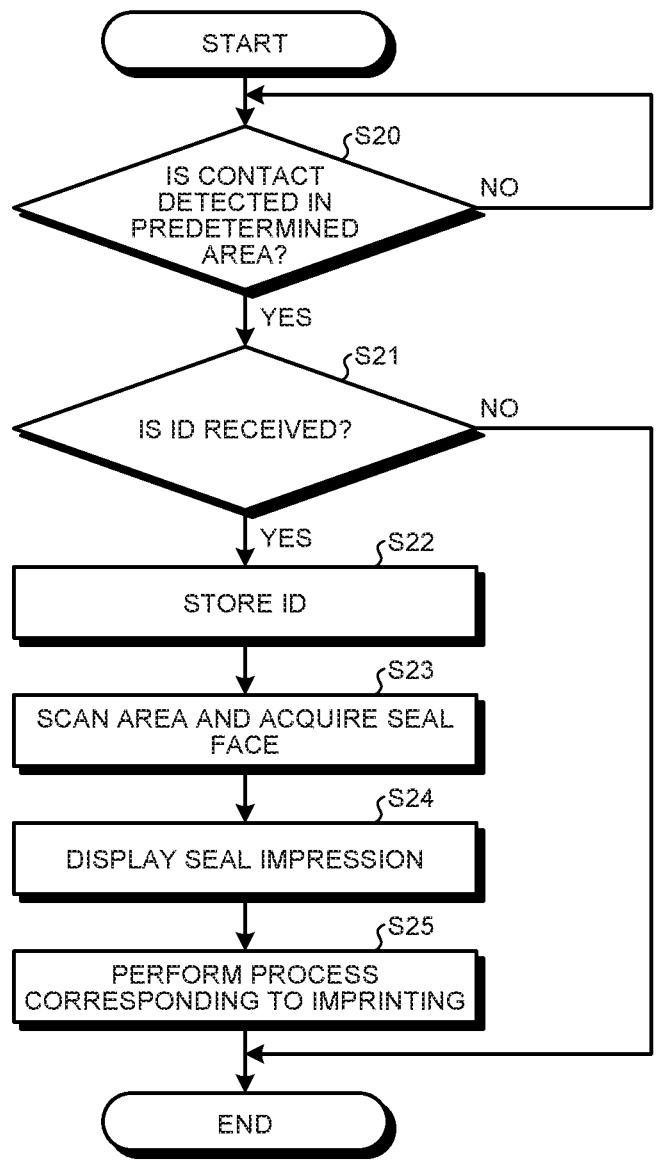
FIG. 13 is an exemplary flowchart illustrating operation of the tablet terminal according to the first embodiment.

FIG. 13 is an exemplary flowchart illustrating operation of the tablet terminal 20 according to the first embodiment. In this example, the above-described document image 300 is used as an example, and contact positions are detected in a range of the imprint areas 310a to 310c (referred to as a predetermined area). At Step S20, the tablet terminal 20 determines whether the detecting unit 260 detects contact in the predetermined area based on a signal from the input control unit 227. If the tablet terminal 20 determines that the contact is not detected, the process returns to Step S20.

In contrast, if the tablet terminal 20 determines that the contact is detected at Step S20, the process proceeds to Step S21. At Step S21, the tablet terminal 20 determines whether the ID information, that is, the imprinting person information, is received. For example, if the communication unit 261 of the tablet terminal 20 receives a signal from the electronic seal 10, the authenticating unit 262 determines whether the received signal is the ID information.

For example, the authenticating unit 262 determines whether information included in the received signal satisfies a specific format, and when determining that the specific format is satisfied, determines that the imprinting person information is included. However, the operation is not limited to this example. The authenticating unit 262 may store one or more pieces of imprinting person information in advance, and may determine whether the received signal includes information that matches any piece of the imprinting person information stored in advance.

At Step S21, when determining that the ID information is not received, the tablet terminal 20 ends a series of the processes of the flowchart in FIG. 13. In contrast, if the tablet terminal 20 determines that the ID information is received, the process proceeds to Step S22, and the tablet terminal 20 stores the received ID information in, for example, the RAM 223.

At subsequent Step S23, the acquiring unit 263 of the tablet terminal 20 acquires the pattern of the seal face 11 by scanning an area in which the contact is detected at Step S20. At subsequent Step S24, the display control unit 264 of the tablet terminal 20 displays, as the seal impression image 30, an image based on the pattern of the seal face 11 acquired at Step S23 on the display device 232.

At subsequent Step S25, the process executing unit 265 of the tablet terminal 20 performs a process corresponding to the imprinting of the electronic seal 10 in the predetermined area. For example, the process executing unit 265 determines in which of the imprint areas 310a, 310b, and 310c provided on the document image 300 illustrated in FIG. 10 the imprinting of the electronic seal 10 has been performed, and performs a process corresponding to the area in which the imprinting has been performed.

In the process at Step S25, various options may be possible. For example, it may be possible to synthesize the seal impression image 30 in the document image 300 in accordance with the area in which imprinting is performed (for example, the imprint area 310a), to thereby generate the document image 300 in which the seal impression image 30 is displayed in the imprint area 310a. For another example, if bibliographic information including creator information or the like is added as attribute information to the document image 300, it may be possible to add, as the bibliographic information, the ID information (imprinting person information) stored in the RAM 223 at Step S22 to the attribute information.

Furthermore, at Step S25, it may be possible to add, as the bibliographic information, imprint-done information indicating an imprint area in which imprinting has been performed, to the attribute information of the document image 300, for example. In this case, the tablet terminal 20 can determine whether imprinting has been performed in all of the imprint areas 310a to 310c. For example, when determining that imprinting has not been performed in any of the imprint areas 310a to 310c, the tablet terminal 20 determines that imprinting operation is not completed. When determining that imprinting has been performed in all of the imprint areas 310a to 310c, the tablet terminal 20 determines that the imprinting operation is completed. It becomes possible to manage the document image 300 for which the imprinting operation is not completed as a non-approved document, and manage the document image 300 for which the imprinting operation is completed as an approved document. The management itself may be performed by the tablet terminal 20, or may be performed by a storage device that stores therein the document image 300.

As described above, according to the first embodiment, by bringing the electronic seal 10 in contact with an object surface, that is, the touch panel 230 of the tablet terminal 20, it is possible to display the pattern generated on the seal face 11 as the seal impression image 30 on the tablet terminal 20 and to realize the imprinting operation using the information processing apparatus. Furthermore, the electronic seal 10 according to the first embodiment transmits the imprinting person information in accordance with contact of the seal face 11 with the object surface, so that it is possible to confirm information on an imprinting person on the tablet terminal 20 side.

In the above description, the electronic seal 10 transmits the ID information at the time of imprinting, and the tablet terminal 20 displays the pattern of the seal face 11 of the electronic seal 10 as the seal impression image 30 and acquires the ID information (imprinting person information); however, the operation is not limited to this example.

For example, the electronic seal 10 may not transmit the ID information at the time of imprinting, and correspondingly, the tablet terminal 20 may not perform determination based on reception or non-reception of the ID information at Step S21. In this case, only the pattern of the seal face 11 of the electronic seal 10 is acquired by the tablet terminal 20 and displayed as the seal impression image 30. If a seal that does not need the imprinting person information, such as a rubber stamp used for general office work, is configured by using the electronic seal 10, only the seal impression image 30 may be satisfactory.

For another example, the electronic seal 10 may transmit only the ID information at the time of imprinting without being provided with an electronic pattern on the seal face 11. In this case, the tablet terminal 20 does not scan the pattern of the seal face 11, but receives the ID information and performs a determination process based on the received ID information. If authentication of an imprinting person is necessary, the purpose can be achieved by only transmission and reception of the ID information.

In this case, by storing the seal impression image 30 associated with the ID information in, for example, the storage 225 of the tablet terminal 20 in advance, it becomes possible to further display the seal impression image 30 corresponding to imprinting.

Second Embodiment

Figure 14:
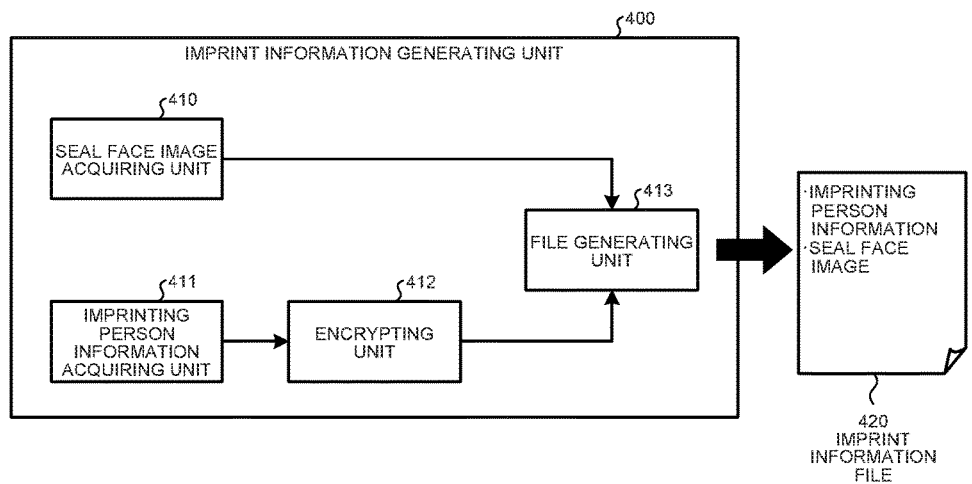
FIG. 14 is a block diagram schematically illustrating a method of generating imprint information used in an authentication process according to a second embodiment.

A second embodiment will be described below. The second embodiment is an example of an authentication system using the electronic seal 10. FIG. 14 schematically illustrates a method of generating imprint information used in an authentication process according to the second embodiment. In FIG. 14, an imprint information generating unit 400 includes a seal face image acquiring unit 410, an imprinting person information acquiring unit 411, an encrypting unit 412, and a file generating unit 413. The imprint information generating unit 400 is included in, for example, a registration server that registers, in the electronic seal 10, imprinting person information and a pattern to be generated on the seal face 11.

The seal face image acquiring unit 410 acquires an image serving as a source of a pattern to be generated on the seal face 11. The image is provided by, for example, a user (imprinting person) who uses the electronic seal 10. Image data of the image acquired by the seal face image acquiring unit 410 is provided to the file generating unit 413. The imprinting person information acquiring unit 411 acquires information on the imprinting person (imprinting person ID). The imprinting person information may be data input by the imprinting person by him/herself, or may be information acquired from a different system with respect to the imprinting person. The imprinting person information acquired by the imprinting person information acquiring unit 411 is encrypted by using a predetermined encryption method by the encrypting unit 412, and is provided to the file generating unit 413.

The file generating unit 413 stores the image data provided from the seal face image acquiring unit 410 and the encrypted imprinting person information provided from the encrypting unit 412 in a single file in an associated manner, to thereby generate an imprint information file 420. For example, the file generating unit 413 generates the imprint information file 420 by adding the encrypted imprinting person information, as header information or footer information, to the image data provided from the seal face image acquiring unit 410.

Figure 15:
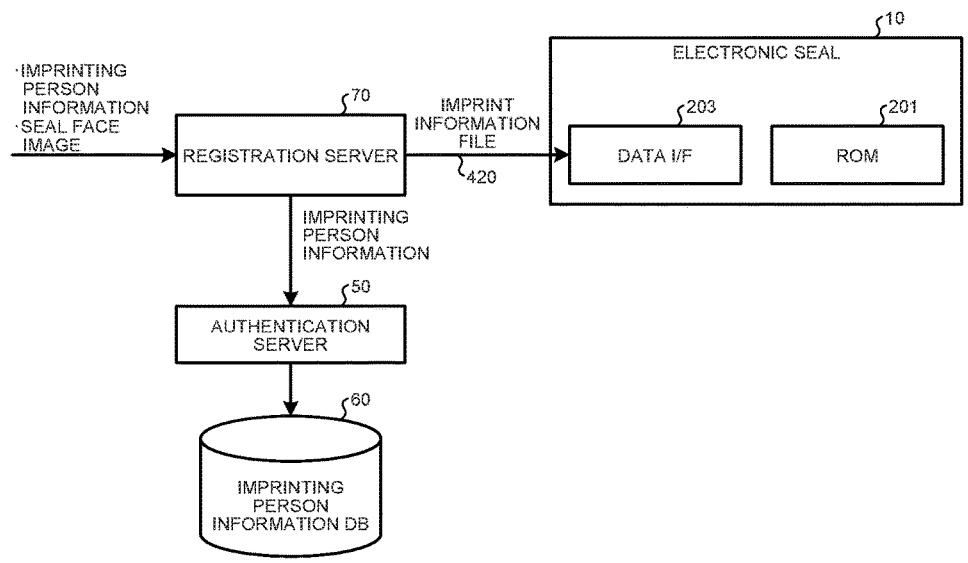
FIG. 15 is a block diagram illustrating an example of a configuration for performing a process of registering an imprint information file in an authentication system according to the second embodiment.

FIG. 15 illustrates an example of a configuration for performing a process of registering the imprint information file with respect to the electronic seal 10 in the authentication system according to the second embodiment. A registration server 70 includes the imprint information generating unit 400 illustrated in FIG. 14. The registration server 70 is provided with the imprinting person information and the image data for generating the seal face 11. As described above with reference to FIG. 14, the registration server 70 encrypts the provided imprinting person information and adds the encrypted information to the image data to thereby generate the imprint information file 420.

The registration server 70 registers the generated imprint information file 420 in the electronic seal 10. For example, the registration server 70 transmits the imprint information file 420 to the electronic seal 10 through communication corresponding to the data I/F 203 of the electronic seal 10. The imprint information file 420 is received by the data I/F 203 of the electronic seal 10. In the electronic seal 10, the registering unit 252 stores the imprint information file 420 in the ROM 201 to register the imprint information.

In the electronic seal 10, the generating unit 251 generates the pattern of the seal face 11 at the time of imprinting, on the basis of the image data included in the imprint information file 420. Furthermore, the communication unit 253 transmits the imprint information file 420 to the tablet terminal 20 at the time of imprinting. However, the operation is not limited to this example, and the communication unit 253 may extract the imprinting person information from the imprint information file 420 and may transmit the imprinting person information to the tablet terminal 20.

It is preferable that only a person who has specific authority can perform the process of registering the imprint information file 420 in the electronic seal 10 by, for example, setting a password or the like.

The registration server 70 transmits at least the imprinting person information between the provided imprinting person information and the provided image data to an authentication server 50. The authentication server 50 decrypts the encrypted imprinting person information transmitted from the registration server 70, and stores the decrypted information in an imprinting person information database (DB) 60.

Figure 16:
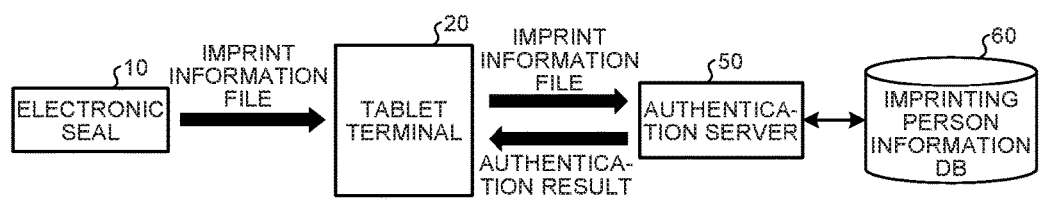
FIG. 16 is a block diagram illustrating an example of the authentication process using an electronic seal according to the second embodiment.

FIG. 16 illustrates an example of the authentication process using the electronic seal 10 according to the second embodiment. If imprinting on the tablet terminal 20 is performed by using the electronic seal 10 in which the imprint information file 420 is registered as described above, the imprint information file 420 is transmitted from the electronic seal 10. The tablet terminal 20 receives the imprint information file 420 transmitted from the electronic seal 10, acquires the seal impression image 30 by scanning the pattern of the seal face 11, and displays the seal impression image 30 on the display device 232.

Furthermore, the tablet terminal 20 transmits the received imprint information file 420 to the authentication server 50 by using, for example, the communication I/F 224. The authentication server 50 decrypts the encrypted imprinting person information included in the imprint information file 420. The authentication server 50 refers to the imprinting person information DB 60, determines whether information that matches the decrypted imprinting person information is registered, and performs authentication of the imprinting person information. An authentication result is transmitted to the tablet terminal 20.

The tablet terminal 20 receives the authentication result transmitted from the authentication server 50 by using, for example, the communication I/F 224. The tablet terminal 20 causes the authenticating unit 262 to determine the authentication result, and when it is determined that the authentication result indicates authentication success, causes the process executing unit 265 to perform a process corresponding to the imprinting. In contrast, the tablet terminal 20 does nothing when the authenticating unit 262 determines that the authentication result indicates authentication failure. It may be possible to provide a message indicating authentication failure to the user.

In FIG. 15 and FIG. 16, the explanation has been made on an example in which the authentication server 50, which performs authentication based on the imprinting person information, and the imprinting person information DB 60 are components outside the tablet terminal 20; however, the configuration is not limited to this example. Specifically, the authentication server 50 and the imprinting person information DB 60 may be included in the tablet terminal 20.

In the second embodiment, the imprinting person information and the image data for generating the pattern of the seal face 11 are managed as the single imprint information file 420 in an associated manner. Therefore, the electronic seal 10 according to the second embodiment may store a plurality of the different imprint information files 420 in the ROM 201, and use the imprint information files 420 in a switchable manner by providing, for example, a switch or the like on the electronic seal 10.

Third Embodiment

A third embodiment will be described below. In the third embodiment, a function to acquire biometric information is added to the electronic seal 10 described in the first embodiment, and an authentication process using the biometric information is enabled.

Figure 17:
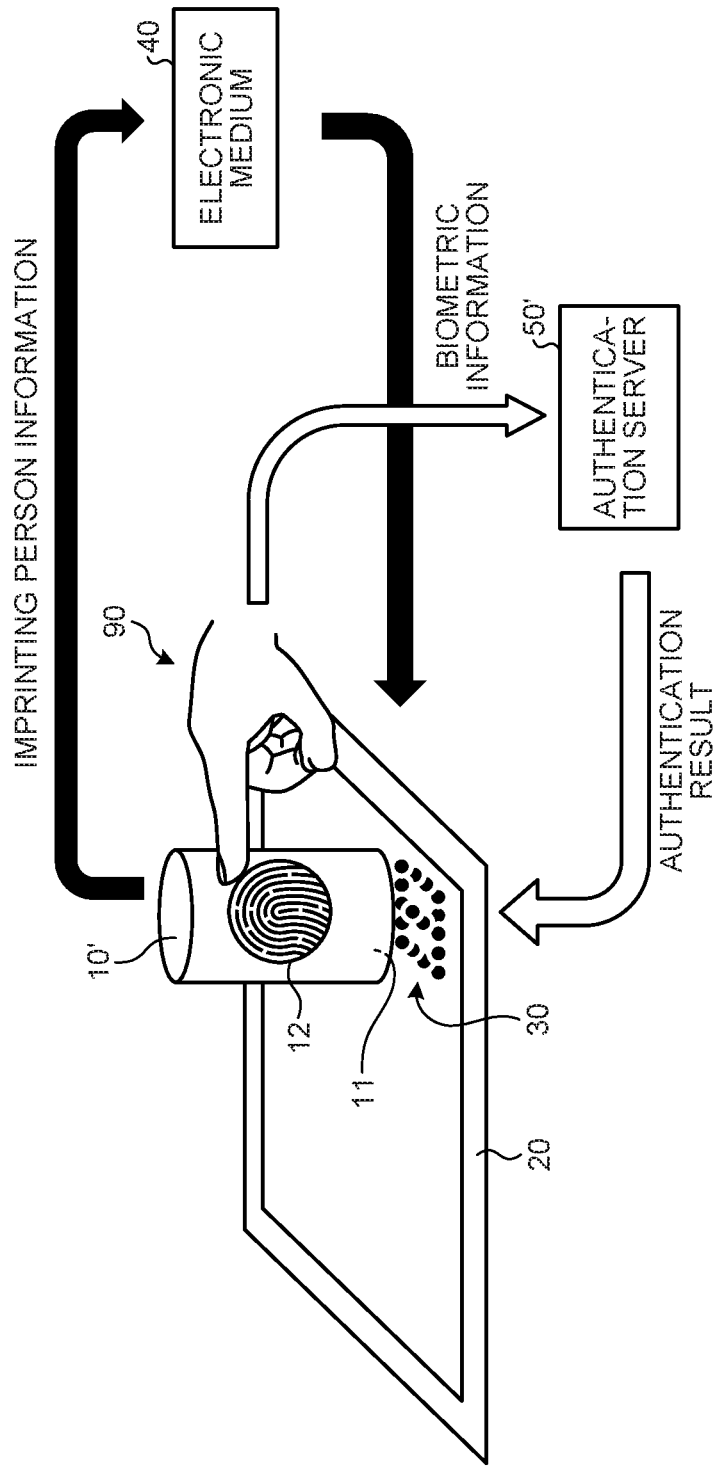
FIG. 17 is a diagram schematically illustrating an imprinting process with an electronic seal according to a third embodiment.

FIG. 17 schematically illustrates an imprinting process with an electronic seal according to the third embodiment. In FIG. 17, the same components as those illustrated in FIG. 1 are denoted by the same reference sings, and detailed explanation thereof will be omitted. In FIG. 17, an electronic seal 10' includes a biometric information acquiring unit 12. The biometric information acquiring unit 12 can acquire biometric information from a finger 90 when, for example, contacted by the finger 90. The biometric information include various kinds of information, such as fingerprint or vein pattern; however, in view of the usage pattern of the electronic seal 10, it is preferable to use fingerprint.

Furthermore, in FIG. 17, an authentication server 50' acquires biometric information instead of the imprinting person information and stores the biometric information as the imprinting person information in the imprinting person information DB 60, as compared to the authentication server 50 described with reference to FIG. 15. However, the embodiment is not limited to this example, and the authentication server 50' may store the biometric information in addition to the above-described imprinting person information.

The electronic seal 10' is imprinted on the touch panel of the tablet terminal 20 similarly to the above, so that the pattern of the seal face 11 is acquired by the tablet terminal 20. The tablet terminal 20 displays the seal impression image 30 based on the acquired pattern of the seal face 11 on the display device included in the touch panel.

Furthermore, the electronic seal 10' transmits the imprinting person information in accordance with the imprinting. At this time, the electronic seal 10' transmits the biometric information acquired by the biometric information acquiring unit 12 to the tablet terminal 20 together with the imprinting person information. The tablet terminal 20 transmits the biometric information to the authentication server 50'. The authentication server 50' refers to the imprinting person information DB 60, determines whether biometric information corresponding to the biometric information transmitted from the tablet terminal 20 is registered, and transmits an authentication result based on the determination result to the tablet terminal 20.

According to the configuration of the third embodiment, it is possible to identify an owner of the electronic seal 10', and improve the security of the electronic seal 10'.

Figure 18:
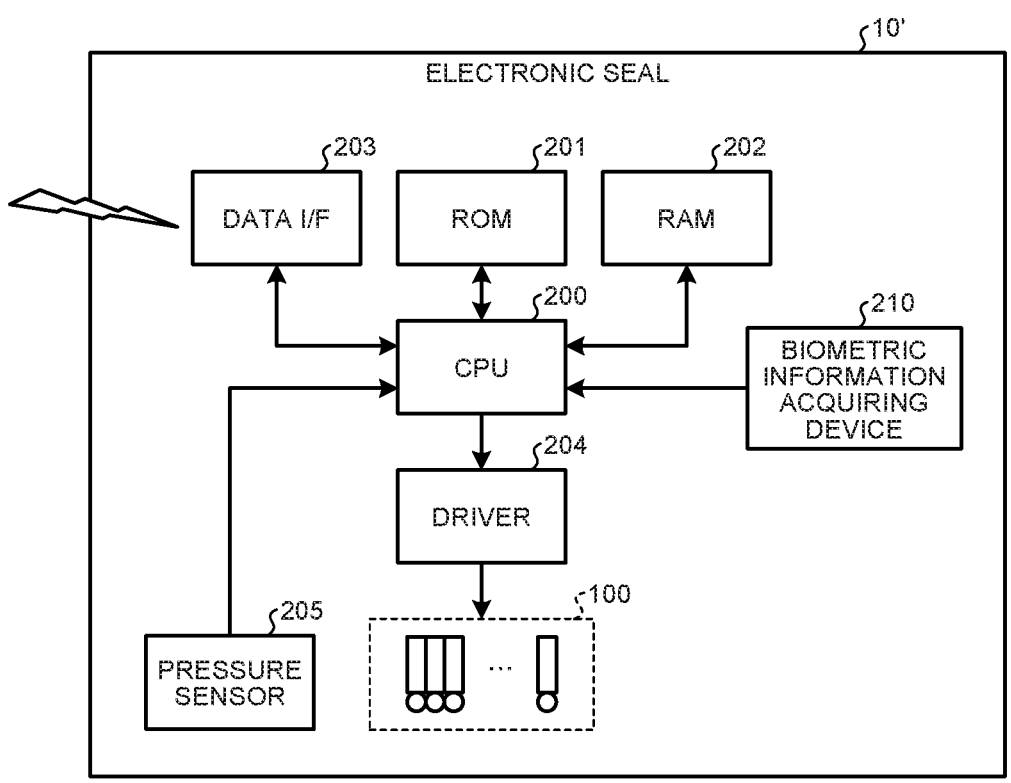
FIG. 18 is a block diagram illustrating an exemplary configuration of the electronic seal according to the third embodiment.

FIG. 18 illustrates an exemplary configuration of the electronic seal 10' according to the third embodiment. In FIG. 18, the same components as those described above with reference to FIG. 6 are denoted by the same reference signs, and detailed explanation thereof will be omitted.

As illustrated in FIG. 18, the electronic seal 10' according to the third embodiment includes a biometric information acquiring device 210 in addition to the components of the electronic seal 10 according to the first embodiment illustrated in FIG. 6. The biometric information acquiring device 210 includes, for example, an image acquiring unit and a fingerprint image extracting unit, and is configured to extract a fingerprint image from an image of a finger acquired by the image acquiring unit. The biometric information acquiring device 210 provides the acquired fingerprint image as the biometric information to the CPU 200.

Figure 19:
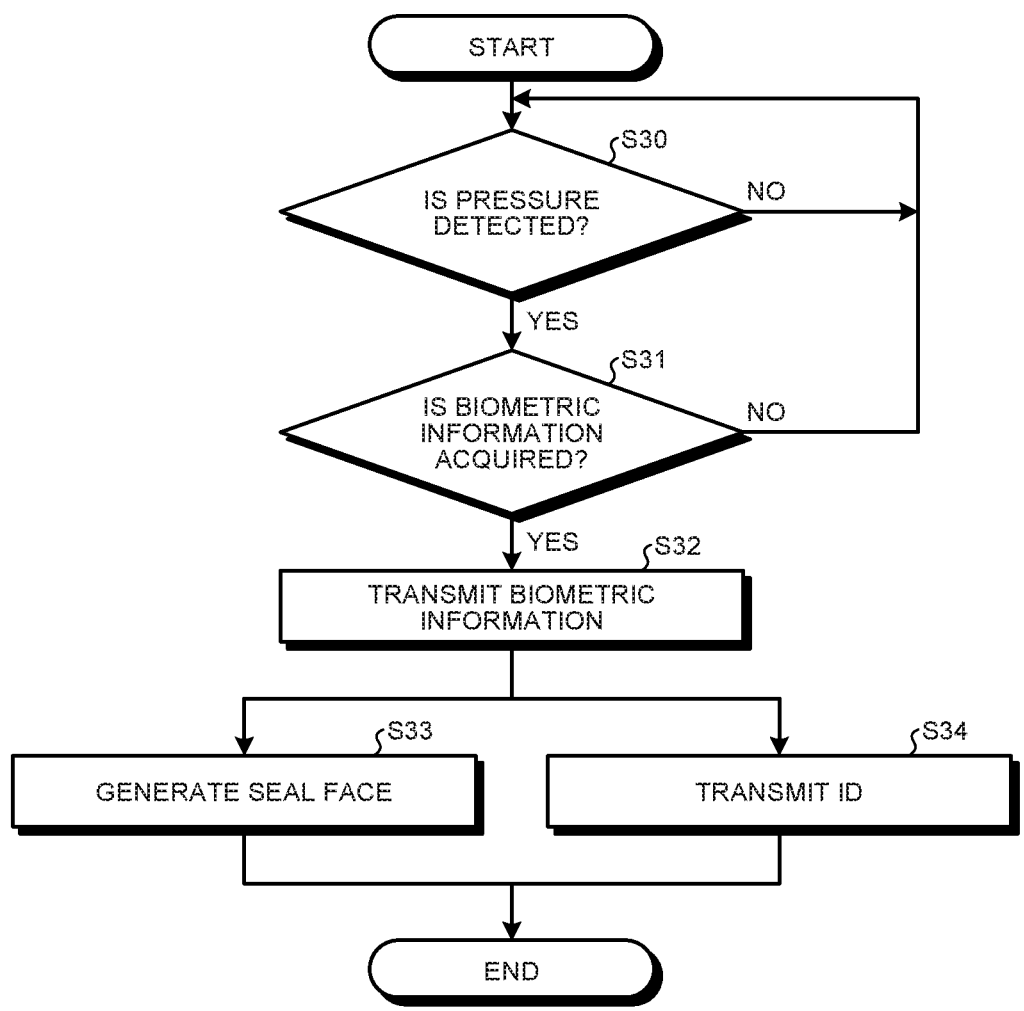
FIG. 19 is an exemplary flowchart illustrating operation of the electronic seal according to the third embodiment.

FIG. 19 is an exemplary flowchart illustrating operation of the electronic seal 10' according to the third embodiment. Before the process of the flowchart in FIG. 19, it is assumed that image data for generating a pattern on the seal face 11 and imprinting person information as information indicating an imprinting person who performs imprinting are stored in advance in the ROM 201 in an associated manner.

At Step S30, the electronic seal 10' determines whether a pressure on the seal face 11 is detected, on the basis of a detection result of the detecting unit 250 corresponding to an output of the pressure sensor 205. If it is determined that the pressure is not detected, the process returns to Step S30. In contrast, if the electronic seal 10' determines that the pressure is detected, the process proceeds to Step S31.

At Step S31, the electronic seal 10' determines whether biometric information is acquired by the biometric information acquiring device 210. If the electronic seal 10' determines that the biometric information is not acquired, the process returns to Step S30. In contrast, if the electronic seal 10' determines that the biometric information is acquired, the process proceeds to Step S32, and causes the communication unit 253 to transmit the acquired biometric information from the data I/F 203.

When the electronic seal 10' transmits the biometric information, the process proceeds to Step S33 and Step S34. The processes at Step S33 and Step S34 may be performed in parallel as illustrated in FIG. 19. Alternatively, the processes at Step S33 and Step S34 may be sequentially performed.

At Step S33, the electronic seal 10' generates a pattern of the seal face 11 by using the generating unit 251, similarly to Step S11 in FIG. 12. Furthermore, at Step S34, the communication unit 253 of the electronic seal 10' reads the imprinting person information that is stored in association with the image data in the registering unit 252, and transmits the read information as ID information from the data I/F 203, similarly to Step S12 in FIG. 12.

When the processes at Step S33 and Step S34 end, a series of the processes of the flowchart in FIG. 19 ends.

Figure 20:
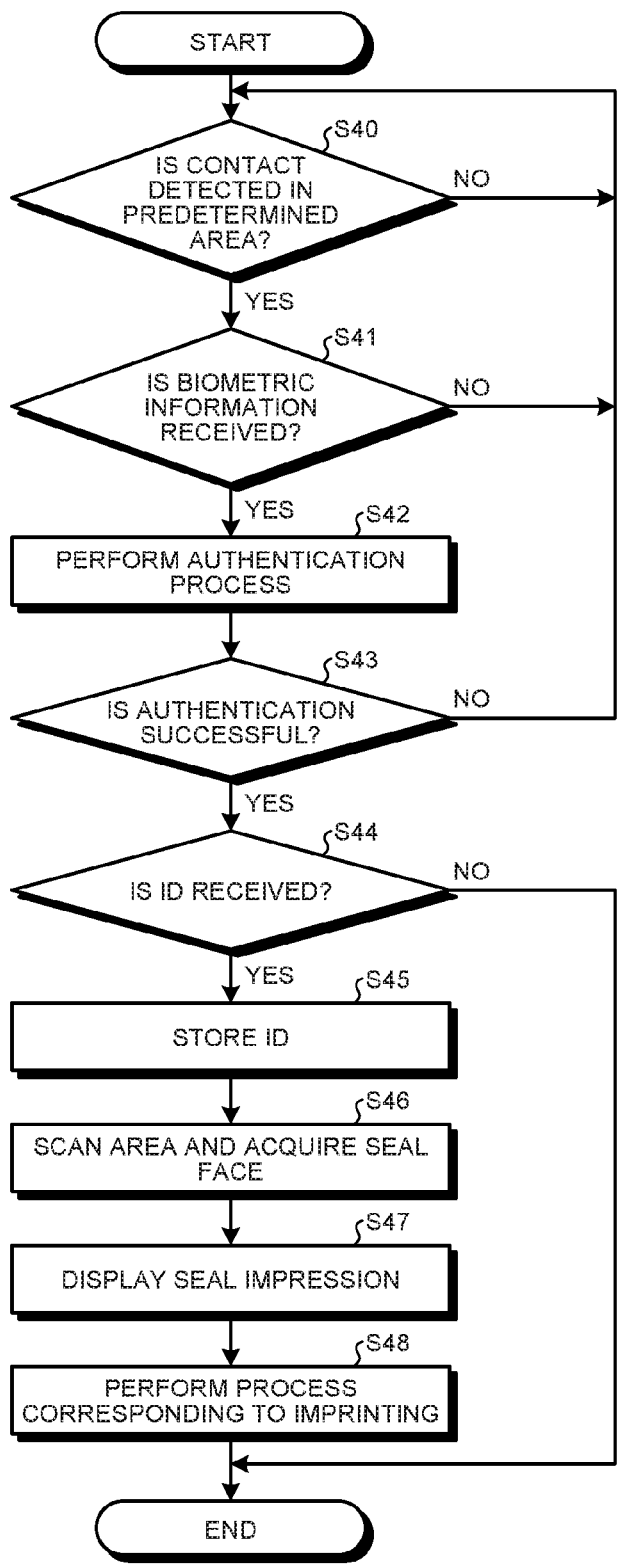
FIG. 20 is an exemplary flowchart illustrating operation of a tablet terminal according to the third embodiment.

FIG. 20 is an exemplary flowchart illustrating operation of the tablet terminal 20 according to the third embodiment. At Step S40, the tablet terminal 20 determines whether the detecting unit 260 has detected contact in a predetermined area based on a signal from the input control unit 227. If the tablet terminal 20 determines that the contact is not detected, the process returns to Step S40.

In contrast, if the tablet terminal 20 determines that the contact is detected at Step S40, the process proceeds to Step S41. At Step S41, the tablet terminal 20 determines whether the biometric information is received. For example, if the communication unit 261 of the tablet terminal 20 receives a signal from the electronic seal 10, the authenticating unit 262 determines whether the received signal is the biometric information. If the tablet terminal 20 determines that the biometric information is not received, the process returns to Step S40.

In contrast, if the tablet terminal 20 determines that the biometric information is received, the process proceeds to Step S42. The authenticating unit 262 of the tablet terminal 20 performs an authentication process using the received biometric information. In this example, the external authentication server 50' performs authentication. Therefore, the authenticating unit 262 transmits the biometric information to the authentication server 50'. The authentication server 50' performs the authentication process on the biometric information transmitted from the tablet terminal 20, and returns an authentication result to the tablet terminal 20.

At Step S43, the authenticating unit 262 of the tablet terminal 20 determines whether the authentication is successful based on the authentication result transmitted from the authentication server 50'. If the authenticating unit 262 of the tablet terminal 20 determines that the authentication has failed, the process returns to Step S40. Specifically, in this case, the tablet terminal 20 does nothing about the imprinting of the electronic seal 10'.

In contrast, if the authenticating unit 262 of the tablet terminal 20 determines that the authentication is successful, the process proceeds to Step S44. At Step S44, the tablet terminal 20 determines whether the ID information, that is, the imprinting person information, is received. If the tablet terminal 20 determines that the ID information is not received, the series of the processes of the flowchart in FIG. 20 ends. In contrast, if the tablet terminal 20 determines that the ID information is received, the process proceeds to Step S45, and the tablet terminal 20 stores the received ID information in, for example, the RAM 223.

At subsequent Step S46, the acquiring unit 263 of the tablet terminal 20 acquires the pattern of the seal face 11 by scanning the area in which the contact is detected at Step S40. At subsequent Step S47, the display control unit 264 displays an image based on the pattern of the seal face 11 acquired at Step S23 as the seal impression image 30 on the display device 232. At subsequent Step S48, the process executing unit 265 of the tablet terminal 20 performs a process corresponding to the imprinting of the electronic seal 10' in the predetermined area.

Fourth Embodiment

A fourth embodiment will be described below. In the above-described third embodiment, the explanation has been made on an example in which the external authentication server 50' performs authentication using the biometric information. In contrast, in the fourth embodiment, the authentication process using the biometric information is performed inside the electronic seal.

Figure 21:
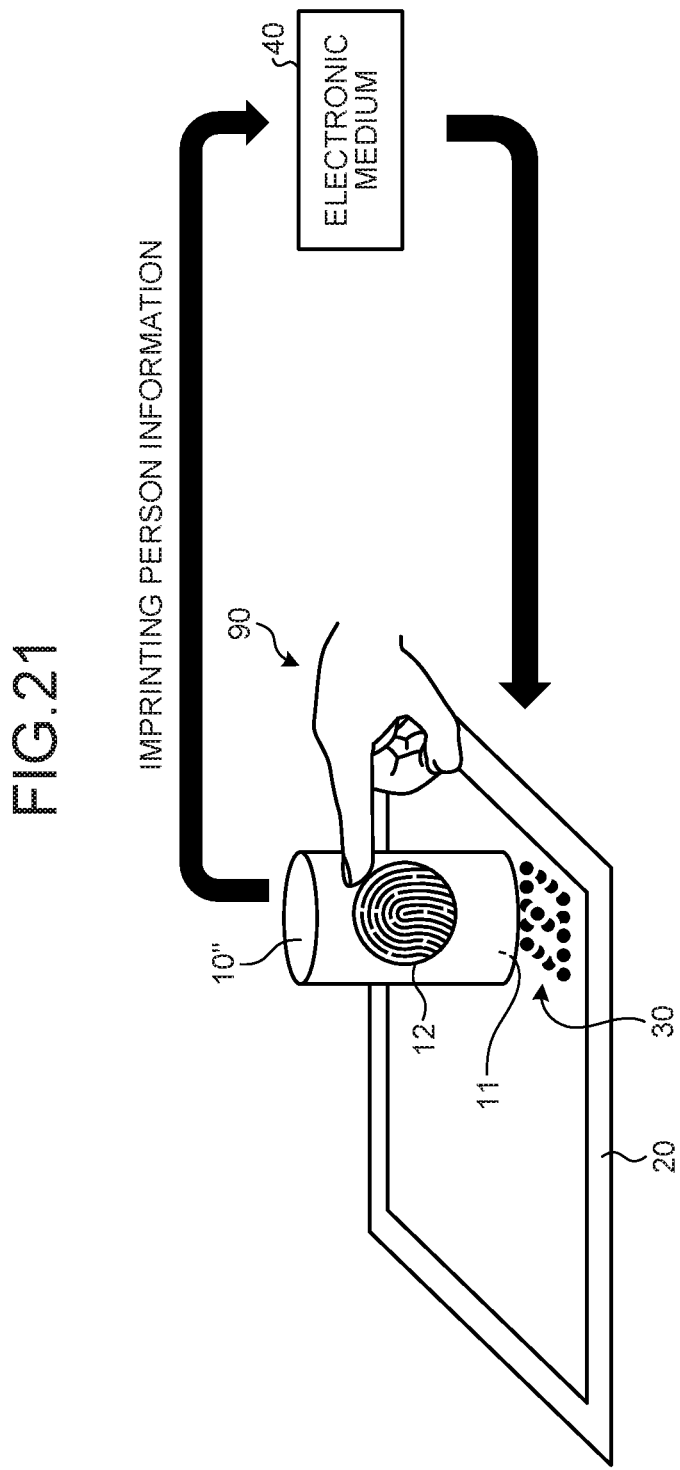
FIG. 21 is a diagram schematically illustrating an imprinting process with an electronic seal according to a fourth embodiment.

FIG. 21 schematically illustrates an imprinting process with an electronic seal according to the fourth embodiment. In the fourth embodiment, in an electronic seal 10" including the same biometric information acquiring unit 12 as that of the electronic seal 10' according to the above-described third embodiment, the ROM 201 is used as a biometric information storage unit for storing therein biometric information in advance, and authentication is performed by comparing the biometric information acquired by the biometric information acquiring device at Step S31 in FIG. 19 and the biometric information stored in advance in the ROM 201. If the authentication is successful, the electronic seal 10" transmits the imprinting person information in the form of the electronic medium 40 to the outside.

In this case, the process performed by the electronic seal 10" when the authentication using the biometric information is successful is the same as the processes after Step S11 in the flowchart in FIG. 12 described in the first embodiment. In contrast, if the authentication using the biometric information has failed, the electronic seal 10" does not form a pattern of the seal face 11 and does not transmit the imprinting person information. Furthermore, the process performed by the tablet terminal 20 is the same as the process of the flowchart in FIG. 13 described in the first embodiment; therefore, explanation thereof will be omitted.

Moreover, even in the fourth embodiment, the electronic seal 10" can hold a plurality of pieces of biometric information. In this case, the electronic seal 10" associates the biometric information, the imprinting person information, and the image data for generating the pattern of the seal face 11 on a one-to-one basis for each piece of the biometric information in, for example, the ROM 201. Therefore, it is possible to distinguish a plurality of imprinting persons by using the single electronic seal 10". As described above, the electronic seal 10" according to the fourth embodiment can be used as a portable authentication device.

The function to perform authentication based on the biometric information in the electronic seal 10" according to the fourth embodiment may be added as a function that is implemented by the CPU 200 in accordance with a program in the electronic seal 10 described with reference to FIG. 8.

According to an embodiment of the present invention, it is possible to electronically reproduce operation of forming a seal impression on a target object through imprinting of a seal by using an information processing apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An electronic seal comprising:
    a seal face including a piezoelectric device and a contact surface connected thereto, the contact surface including a plurality of contact elements configured to contact an object surface of a terminal device; and
    a memory and a processor, the memory containing computer readable instructions executable by the processor to,
        detect contact of the contact surface, and
        generate a pattern on the contact surface in response to detection of the contact of the contact surface, the processor configured to generate the pattern by instructing the piezoelectric device to generate a voltage, and applying the voltage to enabled ones of the contact elements corresponding to the pattern to generate a capacitance between the enabled ones of the contact elements and the object surface such that the pattern is detectable by the object surface of the terminal device.

2. The electronic seal according to claim 1, wherein
    the processor is configured to,
    control an enabled state and a disabled state of each of the contact elements for position detection performed by the object surface, to generate the pattern.

3. The electronic seal according to claim 2, wherein the processor is configured to set one of the enabled state and the disabled state for each of the contact elements in accordance with a order for position detection performed by the object surface, to generate the pattern.

4. The electronic seal according to claim 1, wherein
    the pattern is predefined such that each of the contact elements are the enabled ones of the contact elements.

5. The electronic seal according to claim 1, further comprising:
    a transmitter configured to transmit identification information to the terminal device through wireless communication in response to detection of the contact of the contact surface.

6. The electronic seal according to claim 5, wherein the processor is configured to,
    register, in the memory, an image and the identification information in association with each other, and
    generate the pattern in accordance with the image.

7. The electronic seal according to claim 5, wherein
    the memory is configured to store biometric information in advance, and
    the processor is configured to,
        acquire biometric information and perform an authentication process by comparing the acquired biometric information and the biometric information stored in the memory, and
        transmit, via the transmitter, the identification information to the terminal device, if authentication is successful.

8. The electronic seal according to claim 5, wherein the processor is configured to,
    acquire biometric information,
    transmit the biometric information in accordance with detection of the contact, and
    transmit the identification information to the terminal device, if the electronic seal receives an authentication success notice with respect to the transmitted biometric information.

9. A non-transitory computer-readable storage medium with an executable program stored thereon executable by a processor associated with an electronic seal, the electronic seal including a seal face including a piezoelectric device and a contact surface connected thereto, the contact surface including a plurality of contact elements configured to contact an object surface of a terminal device, the processor configured to,
    detect contact of the contact surface; and
    generate a pattern on the contact surface in response to detection of the contact of the contact surface, the processor configured to generate the pattern by instructing the piezoelectric device to generate a voltage, and applying the voltage to enabled ones of the contact elements corresponding to the pattern to generate a capacitance between the enabled ones of the contact elements and the object surface such that the pattern is detectable by the object surface of the terminal device.

10. An authentication system comprising:
    an electronic seal including,
        a seal face including a piezoelectric device and a first contact surface connected thereto, the first contact surface including a plurality of contact elements configured to contact an object surface, and
        a first memory and a first processor, the first memory containing computer readable instructions executable by the first processor to,
            detect first contact of the first contact surface,
            a generate a pattern on the first contact surface in response to detection of the first contact of the first contact surface, the processor configured to generate the pattern by instructing the piezoelectric device to generate a voltage, and applying the voltage to enabled ones of the contact elements corresponding to the pattern to generate a capacitance between the enabled ones of the contact elements and the object surface such that the pattern is detectable by the object surface, transmit identification information through wireless communication in response to detection of the first contact; and an information processing apparatus including the object surface, a second memory and a second processor, the second memory containing computer readable instructions executable by the second processor to, detect second contact of the object surface provided in accordance with a display surface of a display unit, perform an authentication process based on the identification information received from the electronic seal in response to detection of the second contact, acquire an image in accordance with a position of the second contact on the object surface, if authentication is successful, and display the image at a position corresponding to the position of the display surface.

* * * * *